US009001673B2

(12) United States Patent
Birdsall et al.

(10) Patent No.: US 9,001,673 B2
(45) Date of Patent: Apr. 7, 2015

(54) OUTGOING COMMUNICATIONS INVENTORY

(75) Inventors: Nicole Lee Birdsall, San Jose, CA (US); Mahesh K. Somani, Milpitas, CA (US); Kumar Rethinakaleeswaran, San Jose, CA (US); Mihir Sambhus, Milpitas, CA (US)

(73) Assignee: eBay Inc., San Jose, CA (US)

( * ) Notice: Subject to any disclaimer, the term of this patent is extended or adjusted under 35 U.S.C. 154(b) by 517 days.

(21) Appl. No.: 12/649,181

(22) Filed: Dec. 29, 2009

(65) Prior Publication Data

US 2011/0158252 A1    Jun. 30, 2011

(51) Int. Cl.
| G06F 11/00 | (2006.01) |
| H04L 1/00 | (2006.01) |
| H04L 12/26 | (2006.01) |
| H04L 12/58 | (2006.01) |
| H04L 29/06 | (2006.01) |

(52) U.S. Cl.
CPC .............. *H04L 12/586* (2013.01); *H04L 51/16* (2013.01); *H04L 12/5885* (2013.01); *H04L 63/0227* (2013.01)

(58) Field of Classification Search
CPC .... H04W 24/00; H04L 43/50; H04L 43/0852
USPC .......... 370/417, 252, 253, 254; 709/204, 206, 709/224
See application file for complete search history.

(56) References Cited

U.S. PATENT DOCUMENTS

| 8,170,992 | B2 * | 5/2012 | Ayars ............................ 707/643 |
| 2004/0058693 | A1 * | 3/2004 | Mardirossian ................ 455/458 |
| 2006/0074913 | A1 * | 4/2006 | O'Sullivan et al. ............... 707/9 |
| 2006/0282318 | A1 * | 12/2006 | Larson et al. ................... 705/14 |
| 2007/0016912 | A1 * | 1/2007 | Chen et al. ..................... 719/313 |
| 2007/0038714 | A1 * | 2/2007 | Sell ................................ 709/206 |
| 2007/0108073 | A1 * | 5/2007 | Redmond ...................... 206/268 |
| 2007/0266079 | A1 * | 11/2007 | Criddle et al. ................. 709/203 |
| 2008/0040226 | A1 * | 2/2008 | Roker ............................. 705/14 |
| 2008/0082604 | A1 * | 4/2008 | Mansour et al. .............. 709/203 |
| 2008/0235324 | A1 * | 9/2008 | Abernethy et al. ........... 709/201 |
| 2008/0235344 | A1 * | 9/2008 | Paul .............................. 709/206 |
| 2009/0093264 | A1 * | 4/2009 | Heredia et al. ................ 455/466 |
| 2009/0319614 | A1 * | 12/2009 | Guy ............................... 709/206 |
| 2010/0017487 | A1 * | 1/2010 | Patinkin ........................ 709/206 |
| 2010/0199356 | A1 * | 8/2010 | Krishnamurthy et al. ...... 726/26 |
| 2010/0256994 | A1 * | 10/2010 | Eisenberger et al. ............ 705/3 |
| 2010/0281535 | A1 * | 11/2010 | Perry et al. ...................... 726/22 |
| 2010/0293236 | A1 * | 11/2010 | Wisner et al. ................. 709/206 |
| 2011/0087743 | A1 * | 4/2011 | Deluca et al. ................. 709/206 |

* cited by examiner

*Primary Examiner* — Chuong T Ho
(74) *Attorney, Agent, or Firm* — Maschoff Brennan

(57) ABSTRACT

Systems and methods for generating and accessing a communications inventory are provided. To generate the inventory in one embodiment, a plurality of outgoing communications is received. The outgoing communications may have been auto-generated or generated as part of a batch process. Next, a determination is made that a first outgoing communication of the plurality of outgoing communications is unique relative to other outgoing communications to avoid storing duplicate messages. Lastly, a user may access a display of the first outgoing communication.

22 Claims, 8 Drawing Sheets

400

```
TEMPLATE

Date: DATE
From: list_confirm@publication.com
To: USEREMAIL
Subject: Listing Confirmed: Item Auction Dear USERNAME,
Your item has been successfully listed.  It may take some time for the item to appear
on search results.  Here are the listing details:

Item Name: ITEM NAME
Starting Price: $STARTPRICE
Listing URL: http://publication.com/ITEMNAME
Start Date: STARTDATE
End Date: ENDDATE
Listing fees: $LISTFEE
```

*FIG. 4*

| EMAIL NAME | SITE | INDEX # | TEMPLATE BY | TEMPLATE DATE | DATE CAPTURED |
|---|---|---|---|---|---|
| EmailBidConfirm | Core | 10003 | jsmith | 2/16/2003 | 8/17/2009 |
| EmailBidConfirm | UK | 10003 | jsmith | 2/20/2003 | 8/17/2009 |
| EmailBidConfirm | AU | 10003 | jsmith | 2/20/2003 | 8/17/2009 |
| EmailOutBidNotice | Core | 10004 | jdoe | 5/15/2005 | 8/17/2009 |
| EmailOutBidNotice | CN | 10004 | jdoe | 5/15/2005 | 8/17/2009 |
| EmailListConfirm | Core | 10005 | ylee | 5/15/2005 | 8/17/2009 |
| EmailListConfirm | UK | 10005 | ylee | 5/15/2005 | 8/17/2009 |
| EmailListConfirm | AU | 10005 | ylee | 5/15/2005 | 8/17/2009 |
| EmailListConfirm | CN | 10005 | ylee | 5/15/2005 | 8/17/2009 |
| EmailDailyStatus | Core | 10007 | cyang | 6/12/2006 | 8/17/2009 |
| EmailSavedSearch | Core | 10008 | fkim | 6/12/2006 | 8/17/2009 |
| EmailRegistration | UK | 10009 | jjones | 3/3/2003 | 8/17/2009 |
| EmailInvoice | Core | 10010 | apal | 10/25/2004 | 8/17/2009 |

*FIG. 6*

| EMAIL DATA | 702 | | |
|---|---|---|---|
| Email Name: EmailListConfirm | | Owner 2: | ppan |
| Site: | Core | Last Train: | 08/17/2009 |
| Index #: | 10005 | Last Changed By: | ylee |
| Email Type: | V3 | Last Change Date: | 08/16/2009 |
| Owner 1: | jbaker | Last Change Project #: | 5421 |

HTML VERSION   704

Date: 17 Aug. 2008 16:36:41
From: list_confirm@publication.com
To: publication_user@email.com
Subject: Listing Confirmed: Item Auction Dear Username,
Your item has been successfully listed. It may take some time for the item to appear on search results. Here are the listing details:

Item Name: 1234
Starting Price: $0.01
Listing URL: http://publication.com/item1234
Start Date: Aug. 17, 2009 16:36:41
End Date: Aug. 20, 2009 16:36:41
Listing fees: $0.25

TEXT VERSION   706

Date: 17 Aug. 2008 16:36:41
From: list_confirm@publication.com
To: publication_user@email.com
Subject: Listing Confirmed: Item Auction Dear Username,
Your item has been successfully listed. It may take some time for the item to appear on search results. Here are the listing details:

Item Name: 1234
Starting Price: $0.01
Listing URL: http://publication.com/item1234
Start Date: Aug. 17, 2009 16:36:41
End Date: Aug. 20, 2009 16:36:41
Listing fees: $0.25

*FIG. 7*

OUTGOING COMMUNICATIONS INVENTORY

FIELD

The present application relates generally to network communications and more specifically to maintaining an inventory of outgoing communications for later retrieval.

BACKGROUND

Entities, such as news organizations, companies, and social networks, send a large number of electronic communications per day to employees, customers, members, vendors, potential customers, and subscribers. The electronic communications may be generated according to one or more templates that, in turn, comply with entity-wide policies regarding header information and body content. While the templates are compliant, the actual email sent may be altered and may no longer comply with the policies.

BRIEF DESCRIPTION OF THE DRAWINGS

FIG. 4 is an example template according to various embodiments.

FIG. 6 is a first example user interface for accessing the communications inventory according to various embodiments.

FIG. 7 is a second example user interface for accessing the communications inventory according to various embodiments.

DETAILED DESCRIPTION

Example methods and systems to provide an outgoing email inventory are described. In the following description, for purposes of explanation, numerous specific details are set forth in order to provide a thorough understanding of example embodiments. It will be evident, however, to one skilled in the art that the present invention may be practiced without these specific details.

As used herein, the terms "communication," "outgoing communication," and "electronic communication" collectively refer to messages sent via electrical means, such as electronic mail (email) (e.g., messages sent via simple mail transfer protocol (SMTP)), short message service (SMS) messages, medium message service (MMS) messages, voice mail messages, messages sent within a social network platform or a subscriber platform (e.g., in a customer service environment), facsimiles, and the like. A batch of communications may be assigned an index number or other identifier when sent.

As used herein, the term "contact" refers to those people or entities to which the communications are addressed. Contacts may include, for example, employees, customers, members, vendors, potential customers, and subscribers. The term "contact" may refer to a portion of the entirety of the contacts of the entity. To illustrate, an email described as being sent to contacts may, in operation, be sent to contacts who are customers but not contacts who are employees.

The terms, "inventory" and "communications inventory" refer to electronic communications stored and accessible for review. The communications inventory may be accessible via a database that indexes the communications according to one or more characteristics. The characteristics may include, for example, an index number or other identifier, a date sent or captured by the communications inventory system, a size, a site (e.g., a country) from which the communication was sent, a template author, and a date the template was created.

Often, entities rely on a set of templates to maintain the integrity of the communications being sent with the assumption that if a template is used to generate the communication, it will be compliant with entity-wide policies. When the entity sends large batches of communications to contacts, there may not be a way to view the actual communication sent. The communications inventory system described herein is to sample the outgoing communications, index and store the communications, and to provide a user interface that can be used to review the communications sent by the entity. The communications inventory is collected after the electronic communications are sent to the contacts and may be used to determine if a template should be modified or if a new template should be created.

Figure 1:
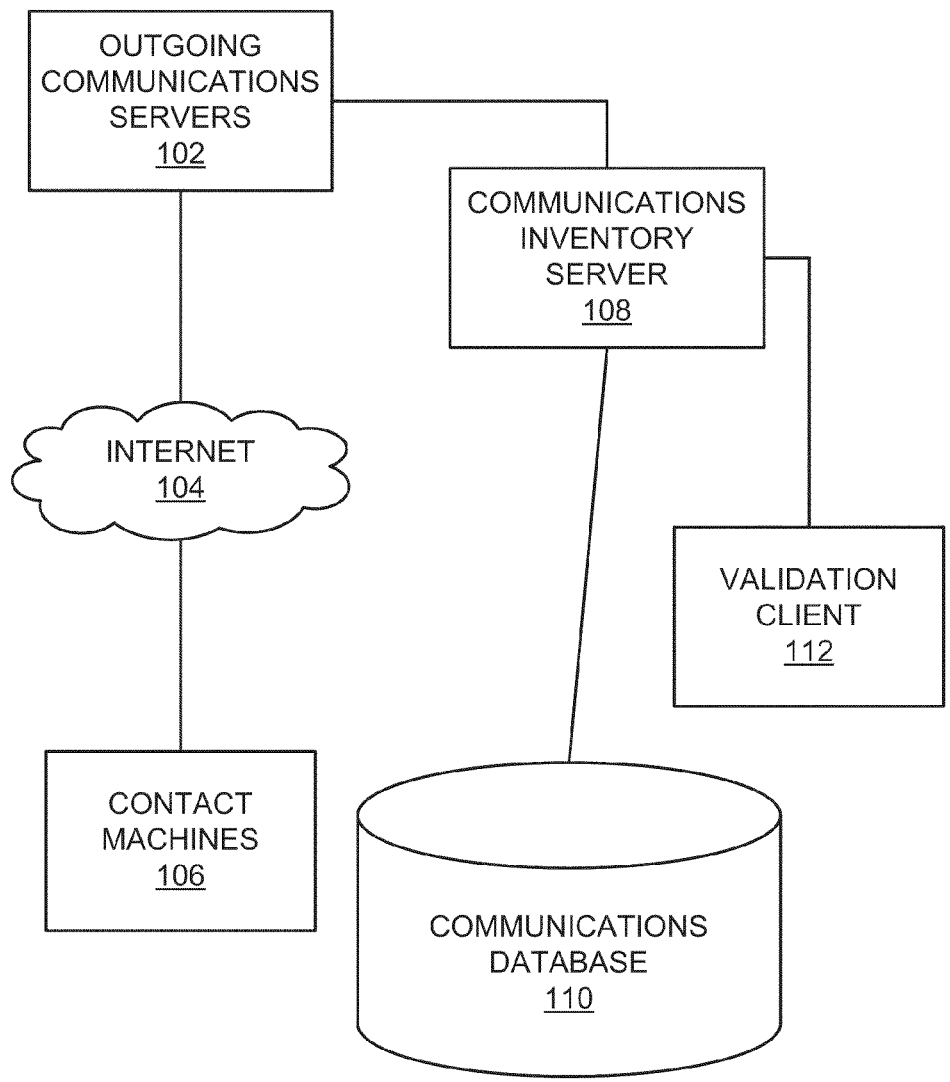
FIG. 1 is a diagrammatic representation of a networked environment within which various embodiments may be practiced.

FIG. 1 is a diagrammatic representation of a networked environment 100 within which various embodiments may be practiced. The networked environment 100 is used to sample the outgoing emails and provide an inventory of those emails.

The networked environment 100 comprises one or more outgoing communications servers 102 for sending communications to contacts. The outgoing communications servers 102 are configured to send electronic communications in batches (each batch having an assigned index number) via a plurality of electronic communication protocols. The communications themselves may include data unique to each recipient such as transaction data (e.g., a name and price of a recently purchased item) and/or personally identifiable information (PII) (e.g., name and address of a user). In some instances, the outgoing communications servers 102 are to maintain a record of previously sent communications. In embodiments where the communications sent are email messages, the record may identify the sent messages by header information, the index number of the batch, a site from which the message was sent, a date the messages were sent, and/or a code release version used to generate the email message.

Example communications protocols used by the outgoing communications servers 102 include SMTP, SMS, MMS, facsimile protocols, and voice messaging protocols. The communications are sent over a network, such as the Internet 104, a local area network (LAN), or a wide area network (WAN), to the contacts. The contacts access the communications using a plurality of contact machines 106. The contact machines 106 may be, for example, a computer, a handheld device, a telephone, a fax machine, or the like.

To provide the communications inventory, the outgoing communications servers 102 are in electronic communication with a communications inventory server 108. The outgoing communications servers 102 send a plurality of sampled communications to the communications inventory server 108. Each sampled communication is one communication of a batch of communications sent to the contacts. The outgoing communications servers 102 may sample the outgoing communications continuously and cache the sampled communications until they are sent to the communications inventory server 108. In some instances, the outgoing communications servers 102 individually compare the sampled communication to communications or records of communication that were previously sent from itself to the communications inventory server 108 to avoid sending duplicate communications.

The communications inventory server 108 is to receive the sampled communications from the outgoing communications servers 102. In some embodiments, the communications inventory server 108 scrubs personally identifiable information (PII) from the sampled communications. The communications inventory server 108 compares the sampled communication to other sampled communications to avoid storing duplicate communications. The communications are then stored in a communications database 110 as described in greater detail below.

To access and review the stored communications, a validation client 112 may be provided. The validation client 112 may be accessible via a browser or dedicated application in a computer system. The validation client 112 may provide a number of user interfaces to access, search, sort, and/or view the communications as described further below.

Figure 2:
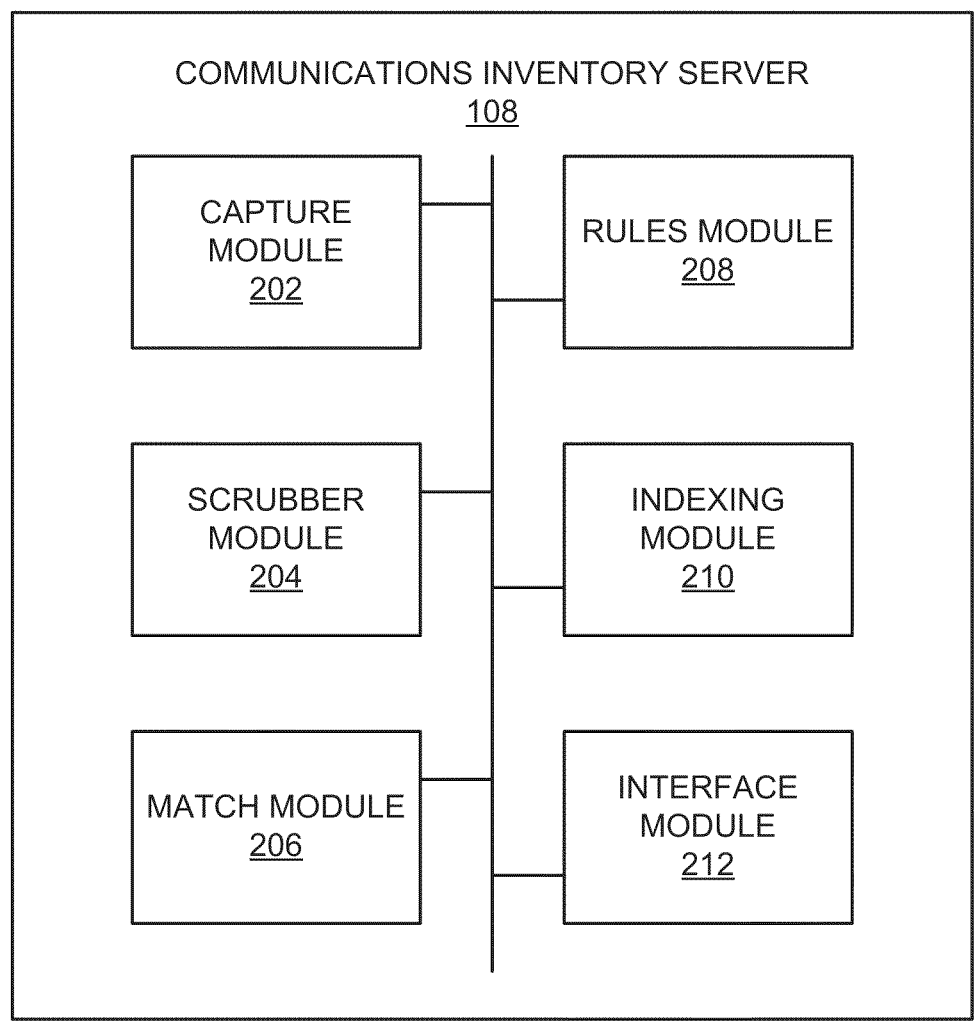
FIG. 2 is a block diagram of a communications inventory server according to various embodiments.

FIG. 2 is a block diagram of a communications inventory server 108 according to various embodiments. The communications inventory server 108 receives outgoing communications and generates an inventory of those communications. The inventory is then accessible by the validation client 112 of FIG. 1. The communications inventory server may comprise a capture module 202, a scrubber module 204, a match module 206, a rules module 208, an indexing module 210, and/or an interface module 212.

The capture module 202 is to receive the communications from the outgoing communications servers 102 of FIG. 1. As the outgoing communications servers 102 may include a number of servers, the capture module 202 may poll each server of the outgoing communications servers 102 at a predetermined frequency (e.g., once per day). When polled, the capture module 202 receives one or more cached communications from the polled server. The cached communications may or may not be transmitted with a record of the communications generated by the respective outgoing communications server 102. If the communication is an email message, the record may include data such as header information, a unique email identifier, a site the email message was sent from, a date the email messages was sent, and/or a code release version used to generate the email message.

Upon the capture of the email messages, the scrubber module 204 may remove any PII in the communication. PII may comprise a user's name, address, telephone number, email address, username, account number, payment data (e.g., credit card number, billing address, checking account number, etc.), birth date, social security number, password, etc. The PII may be removed according to a set of heuristics to identify the PII. In some instances, the communications themselves may include one or more tags or field identifiers identifying a portion of the communication as containing PII or a specific type of data that is PII. In other instances, the PII may be identified by one or more special characters (e.g., an email address may be identified by an "@" symbol) or according to an expected format (e.g., a social security number may be identified by the format "nnn-nn-nnnn") The identified PII may be removed or may be replaced using a placeholder. For example, a contact's first name may be replaced with the placeholder "firstname." The placeholder itself may or may not be indicative of the PII being replaced.

The match module 206 determines whether a copy of the captured communication has been previously stored in the communications database 110 of FIG. 1. Duplicate captured communications may occur, for example, if the batch containing both captured communications was sent from more than one of the outgoing communications servers 102. The match module 206 may make the determination based on one or more characteristics of each captured communication. For instance, the match module 206 may compare an index number of the communication and a site from which the communication was sent.

The rules module 208 determines whether the communication complies with one or more heuristics. The heuristics are based on the entity policies for out-going communications or on templates from which the communications are generated. The rules module 208 may parse each communication according to the heuristics and flag violations within the communication. The communication may be parsed based on parts of the communication. For example, an email message comprises a header and a body, each of which is parsed according to at least some of the heuristics. Alternatively or additionally, the communication may itself be flagged if a threshold number of violations is met and/or if a specific violation is present. In some instances, more than one set of heuristics may exist. Further, each communication (or portion thereof) may be evaluated using more than one set of heuristics. The heuristics used to evaluate a particular communication may be selected based on, for example, a type of communication (e.g., email, SMS message, voice message, etc.), a site from which the communication was sent (e.g., country), and/or an index number of the communication.

The heuristics may include determining if a logo is included in a message, if the recipient of the message is greeted by name, if a correct footer in the body of the communication is used, if links to websites, email addresses, etc. included in the body of the communication are active and link to the correct page, and if the "From" email address or telephone number is readily recognizable as being from the entity. Particularly for the heuristics involving links in the body of the message, some links, such as an "unsubscribe" link, may be excluded from testing. The heuristics may additionally or alternatively include comparing the email format to an existing template; evaluating the message based on specified guidelines such as a call to action (CTA), merchandizing logic, image sizes, image placement guidelines, and whether links and references have alternative text; and a determination that a pre-defined set of components (e.g., text and graphics) are included or excluded from a message.

In some embodiments, the rules module 208 may determine a type of the communication of an outgoing communication to determine a set or portion of the heuristics to apply. To illustrate, the outgoing communication may be identified as an email having an html version or as an SMS message. A first set of heuristics may be applied to emails comprising an html version while a second set of heuristics may be applied to the SMS messages.

In some instances, if, for example, a logo is detected or if the communication is otherwise in compliance with the entity policy, the rules module 208 may record compliance metadata indicating that the communication is compliant with one or more entity policies. The compliance metadata may be stored in the communications database 110, for example. In some instances, the communications may be indexed according to the compliance metadata. In other instances, the communications may be flagged as being compliant with one or more entity policies.

The indexing module 210 identifies index data based on the characteristics of the communication. The index data may be used to populate a database for sorting and/or organizing the communications. The index data may include an index number, a version number, a name (e.g., subject) of the communication, a date the communication was received, a site (by country or geographical region) from which the communication was sent, and/or by detected violations. For communications generated based on a template, other characteristics that may be identified include a template used to generate the communication, a date that template was last updated, a project identifier associated with the template, and/or the author of the template. To more efficiently allocate review of the stored communications, one or more people may be assigned to review the communication. Additional or alternative characteristics of the stored communication may also be identified.

The interface module 212 provides a user interface and/or an application programming interface (API) for accessing the index data and/or the communications inventory. The interface module 212 may allow access to the index data and/or the communications inventory based on roles and permissions associated with a reviewer.

Figure 3:
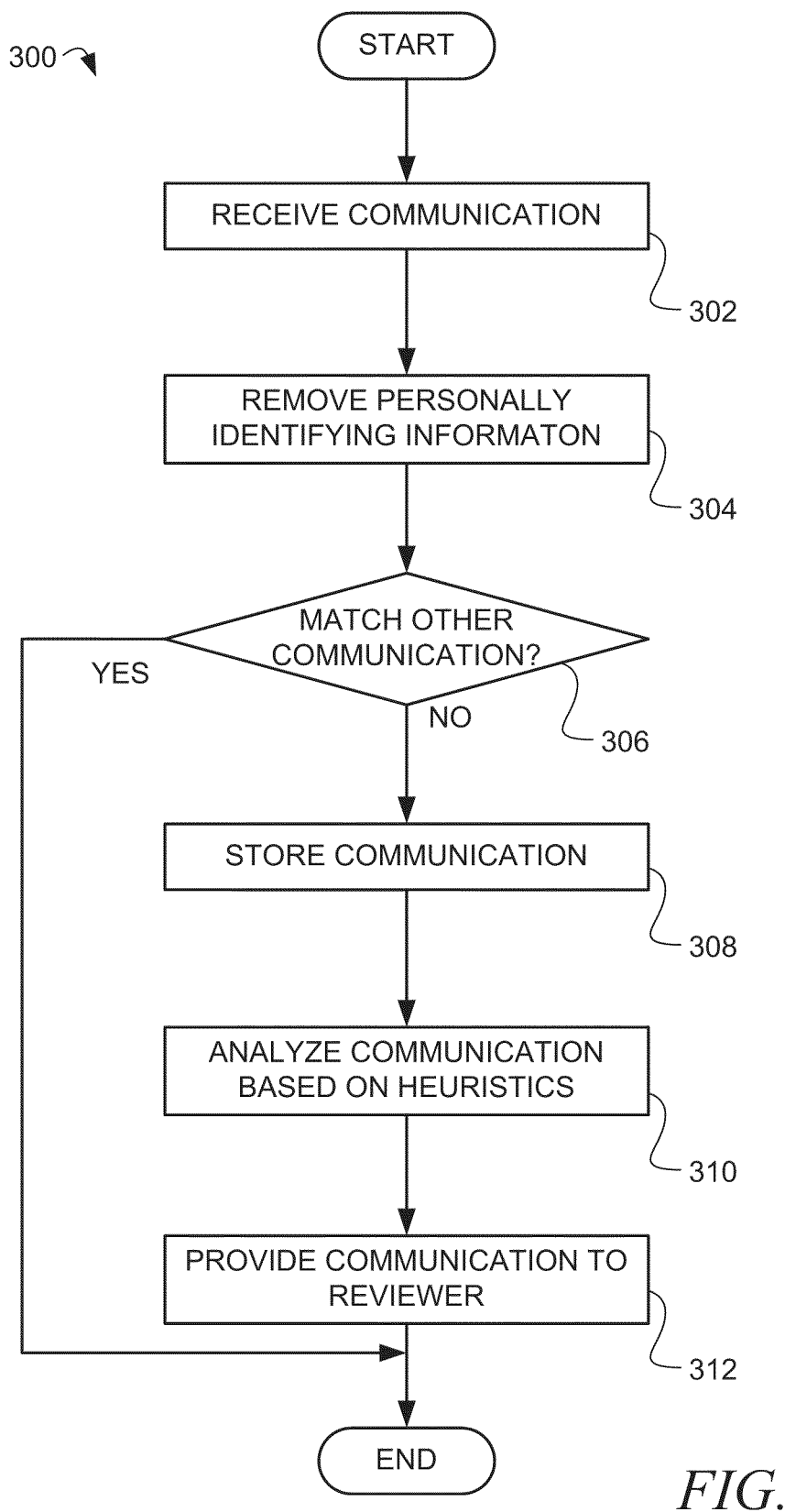
FIG. 3 is a flowchart of a process for providing a communications inventory according to various embodiments.

FIG. 3 is a flowchart of a process 300 for providing a communications inventory according to various embodiments. The communications in the communications inventory may be stored in the communications database 110 of FIG. 1. The process 300 may be performed by the communications inventory server 108 of FIG. 1. It is understood that the operations in the process 300 may be performed in another order.

In an operation 302, a communication is received from a respective outgoing communication server 102 of FIG. 1. The communication may be received as one communication of a plurality of communications from the respective outgoing communication server 102. The communications may be received periodically from the outgoing communications servers 102 (e.g., once every twenty-four hours).

In an operation 304, the PII is removed from the received communication. The operation 304 may be performed by the scrubber module 204 of FIG. 2. The PII may or may not be replaced with one or more placeholders. In some instances, the PII may be partially removed, for example, a recipient's first name may be replaced by only the first letter of the first name.

In an operation 306, a determination is made as to whether the received communication matches a communication that was previously received. The matching may be performed by the match module 206 of FIG. 2. Two communications may match even if they have different recipients (i.e., contain or previously contained different PII) and/or different transaction data.

In an operation 308, if the communication does not match another stored communication, the communication is stored in the communications database 110 and indexed by the indexing module 210 of FIG. 2. The index may be stored in the communications database 110 of FIG. 1 or in another location.

In an operation 310, the stored communication may be analyzed using one or more heuristics or sets of heuristics by the rules module 208 of FIG. 2. The stored communication, and/or portions of the stored communication, may be flagged as containing one or more violations of the heuristics. The flags may or may not be added to the index.

In some instances, the operation 310 may comprise comparing the stored communication to a template from which the communication was generated. The template may be identified based, for example, on a template identifier in the header or body of the communication. Based on the comparison, one or more inconsistencies may be flagged.

Referring to FIG. 4, an example template 400 from which a communication may be generated is shown. The template may comprise text, graphics, a sender address and one or more fields that are fillable with information specific to a user. The template shown includes fillable fields having an underlined alphanumeric identifier.

Figure 5:
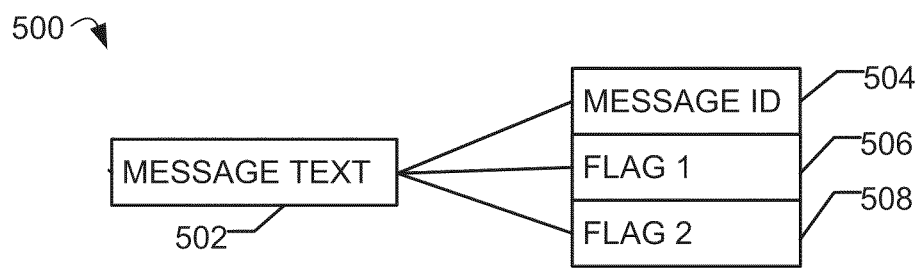
FIG. 5 is an example data structure according to various embodiments.

Referring to FIG. 5, an example data structure (within, for example, communications database 110) for storing flags associated with a particular message is shown. The example data structure 500 comprises a message text 502 from an outgoing communication. The message text 502 is associated with a message ID 504 and one or more flags 506 and 508. The flags 506 and 508 may indicate that the outgoing communication is either compliant or non-compliant with one or more entity policies.

Referring back to FIG. 3, in an operation 312, the stored communication(s), index data, and/or flags are provided to a reviewer at the validation client 112 of FIG. 1. The reviewer may be a user or may initiate an automatic process such as, for example, a batch application, a bot, or a notification program. The reviewer may receive the one or more of the stored communications as search results in response to performing a query on the index data or on the stored communications. The reviewer may view the stored communication(s), index data, and/or flags as a webpage, spreadsheet, database, or other user interface. The reviewer may be able to annotate the stored communication(s), index data, and/or flags.

FIG. 6 is a first example user interface 600 for accessing the communications inventory according to various embodiments where the inventory includes email messages. The user interface 600 displays the index data of the stored communications in a sortable table. The index data shown includes the email name, site, index number, template by (author) template (creation) date, and the date the communication was captured. Additional or alternative index data may be shown depending, for example, on user preferences or permissions. In some instances, a link to each of the stored communications is provided (not shown) in one of the columns.

FIG. 7 is a second example user interface 700 for accessing the communications inventory according to various embodiments where the stored communication is an email message. The user interface 700 may be provided or displayed upon clicking a link in the table in FIG. 6. The user interface 700 includes three fields: an email data field 702, an HTML version region 704, and a text version region 706.

The email data field 702 includes all or a portion of the index data corresponding to this particular stored communication. The html version region 704 includes a copy of, or a screenshot of, the HTML version of the email stored in the communications database 110 of FIG. 1. The html version may include one or more images, live links, or other features supported by HTML. The text version region 706 is a copy of, or a screenshot of, the text version of the same communication. The text version is typically the same as the html version except that it does not include the additional features supported by HTML.

As shown, the user interface 700 is scrubbed of PII. The PII has been replaced by one or more placeholders. For example, the user's email address in the "To:" field is replaced by a generic email address, namely, "publication user@email.com" and the user's name is replaced by the placeholder, "Username." In some instances, the interface 700 may include one or more flags. The flags may be displayed as a list, highlighted portions, arrows, or other visual indicators of the heuristics violations.

Figure 8:
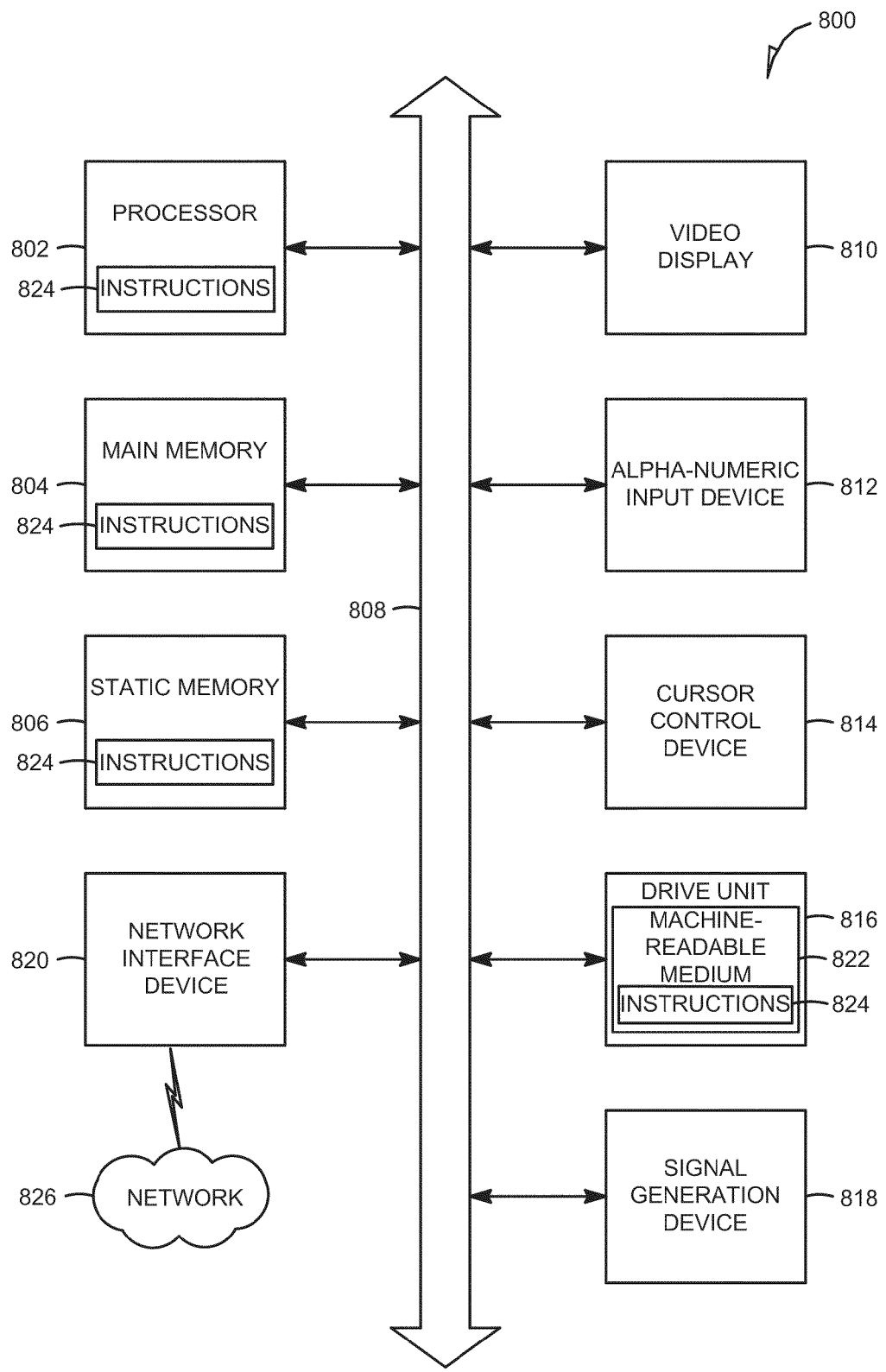
FIG. 8 is a diagrammatic representation of machine within which a set of instructions, for causing the machine to perform any one or more of the methodologies discussed herein, may be executed.

FIG. 8 is a general diagrammatic representation of a machine, one of more portions of which are included within any of the servers, clients, or other machines referred to in the description for performing one or more of the methodologies or operations described herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system to generate and maintain a communications inventory have been described. Although the present invention has been described with reference to specific example embodiments, it will be evident that various modifications and changes may be made to these embodiments without departing from the broader spirit and scope of the invention. Various embodiments described herein may operate to solve one or more technical problems by allowing outgoing communications to be monitored to anticipate contact needs and questions. Accordingly, the specification and drawings are to be regarded in an illustrative rather than a restrictive sense.

Some embodiments described herein may be used to solve one or more technical problems. For example some embodiments may facilitate more efficient resource management and reduce the need to redeploy a system in event of a failure or performance lag or when adding to or modifying an architecture domain.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   one or more hardware processors coupled to a memory, wherein the memory stores a capture module, a math module, and an interface module, wherein:
   the capture module configured to receive a plurality of outgoing communications;
   the match module configured to
     determine that a first sampled outgoing communication of the plurality of outgoing communications belongs to a first batch of outgoing communications sent to contacts and
     determine that the first sampled outgoing communication is a first version that corresponds to a first site and that a second sampled outgoing communication of the plurality of outgoing communications is a second version that corresponds to a second site, the first version and the second version being versions of a particular outgoing communication of the plurality of communications; and
   the interface module configured to generate a user interface to display the first sampled outgoing communication to a user.

2. The system of claim 1, wherein the memory further comprises:
   a scrubber module configured to remove personally identifiable information from the first sampled outgoing communication.

3. The system of claim 1, wherein the memory further comprises:
   a rules module configured to identify violations of predefined heuristics in the first sampled outgoing communication.

4. The system of claim 1, wherein the memory further comprises:
   an indexing module configured to identify a plurality of characteristics from the first sampled outgoing communication by parsing the first sampled outgoing communication.

5. The system of claim 1, wherein the capture module is further configured to identify a text version of the first sampled outgoing communication and to identify an html version of the first sampled outgoing communication.

6. The system of claim 1, wherein the first site corresponds to a first country and the second site corresponds to a second country.

7. The system of claim 1, wherein the match module is further configured to determine that the first sampled outgoing communication corresponds to a first template.

8. The system of claim 7, wherein the match module is further configured to determine one or more changes to the first template in the first sampled outgoing communication.

9. The system of claim 1, wherein the plurality of outgoing communications comprise electronic mail messages.

10. A method comprising:
receiving a plurality of outgoing communications;
determining, by one or more hardware processors, that a first sampled outgoing communication of the plurality of outgoing communications belongs to a first batch of outgoing communications sent to contacts;
determining that the first sampled outgoing communication is a first version that corresponds to a first site and that a second sampled outgoing communication of the plurality of outgoing communications is a second version that corresponds to a second site, the first version and the second version being versions of a particular outgoing communication of the plurality of communications; and
generating a user interface to display the first sampled outgoing communication to a user.

11. The method of claim 10, further comprising: removing personal identifying information from the first sampled outgoing communication prior to displaying the first sampled outgoing communication to the user.

12. The method of claim 10, further comprising: identifying violations of predefined heuristics in the first sampled outgoing communication.

13. The method of claim 12, wherein a violation of the predefined heuristics comprises an inactive link in the first sampled outgoing communication.

14. The method of claim 12, wherein identifying a violation of the heuristics comprises determining that the first sampled outgoing communication is an html version and wherein at least a portion of the predefined heuristics are applied to the html communication but not to a text version.

15. The method of claim 10, further comprising: identifying a plurality of characteristics from the first sampled outgoing communication by parsing the first sampled outgoing communication.

16. The method of claim 10, wherein the receiving of the plurality of communication further comprises receiving a text version of the first sampled outgoing communication and receiving an html version of the first sampled outgoing communication.

17. The method of claim 10, wherein the first site corresponds to a first country and the second site corresponds to a second country.

18. The method of claim 10, further comprising determining that the first sampled outgoing communication corresponds to a first template.

19. The method of claim 18, further comprising determining one or more changes to the first template in the first sampled outgoing communication.

20. The method of claim 19, wherein the plurality of outgoing communications comprise electronic mail messages.

21. A non-transitory computer readable storage medium having instructions embodied thereon, the instructions executable by one or more hardware processors of a machine to cause the machine to perform operations comprising:
receiving a plurality of outgoing communications;
determining that a first sampled outgoing communication of the plurality of outgoing communications belongs to a first batch of outgoing communications sent to contacts;
determining that the first sampled outgoing communication is a first version that corresponds to a first site and that a second sampled outgoing communication of the plurality of outgoing communications is a second version that corresponds to a second site, the first version and the second version being versions of a particular outgoing communication of the plurality of communications; and
generating a user interface to display the first sampled outgoing communication to a user.

22. An apparatus, comprising:
first means to receive a plurality of outgoing communications;
second means to determine that a first sampled outgoing communication of the plurality of outgoing communications belongs to a first batch of outgoing communications sent to contacts;
third means to determine that the first sampled outgoing communication is a first version that corresponds to a first site and that a second sampled outgoing communication of the plurality of outgoing communications is a second version that corresponds to a second site, the first version and the second version being versions of a particular outgoing communication of the plurality of communications; and
fourth means to generate a user interface to display the first sampled outgoing communication to a user.

* * * * *

UNITED STATES PATENT AND TRADEMARK OFFICE
CERTIFICATE OF CORRECTION

PATENT NO. : 9,001,673 B2  Page 1 of 1
APPLICATION NO. : 12/649181
DATED : April 7, 2015
INVENTOR(S) : Birdsall et al.

It is certified that error appears in the above-identified patent and that said Letters Patent is hereby corrected as shown below:

In the Specification

In Column 3, Line 63, please delete ""nnn-nn-nnnn") The" and insert -- ""nnn-nn-nnnn"). The --.

In Column 6, Line 64, delete "publication user@email.com" and insert
-- publication_email@email.com --.

In the Claims

In Column 8, Line 30, in Claim 1, delete "math" and insert -- match --.

Signed and Sealed this
Eleventh Day of August, 2015

Michelle K. Lee
*Director of the United States Patent and Trademark Office*